US012560698B2

(12) United States Patent
Nickel

(10) Patent No.: US 12,560,698 B2
(45) Date of Patent: Feb. 24, 2026

(54) RF NAVIGATION FOR MOTOR VEHICLES

(71) Applicant: Janice H. Nickel, Pacifica, CA (US)

(72) Inventor: Janice H. Nickel, Pacifica, CA (US)

(73) Assignee: TechNickel, Inc., Pacifica, CA (US)

( * ) Notice: Subject to any disclaimer, the term of this patent is extended or adjusted under 35 U.S.C. 154(b) by 358 days.

(21) Appl. No.: 18/165,882

(22) Filed: Feb. 7, 2023

(65) Prior Publication Data

US 2023/0184922 A1 Jun. 15, 2023

Related U.S. Application Data

(63) Continuation-in-part of application No. 15/260,266, filed on Sep. 8, 2016, now Pat. No. 11,591,020.

(51) Int. Cl.
| | |
|---|---|
| *G01S 13/75* | (2006.01) |
| *E01F 9/30* | (2016.01) |
| *E01F 9/553* | (2016.01) |
| *E01F 9/576* | (2016.01) |

(52) U.S. Cl.
CPC .............. *G01S 13/758* (2013.01); *E01F 9/30* (2016.02); *E01F 9/553* (2016.02); *E01F 9/578* (2016.02)

(58) Field of Classification Search
CPC .................................................... G01S 13/758
See application file for complete search history.

(56) References Cited

U.S. PATENT DOCUMENTS

| | | | | |
|---|---|---|---|---|
| 6,758,089 B2* | 7/2004 | Breed | .............. | G08G 1/096783 |
| | | | | 73/146 |
| 6,772,062 B2* | 8/2004 | Lasky | .................. | G05D 1/0261 |
| | | | | 701/518 |
| 11,591,020 B1* | 2/2023 | Nickel | .................... | G01C 21/26 |
| 2009/0256723 A1* | 10/2009 | Peddie | ............. | G08G 1/096783 |
| | | | | 340/907 |
| 2010/0052971 A1* | 3/2010 | Amarillas | ............. | G01S 13/862 |
| | | | | 342/22 |
| 2017/0345296 A1* | 11/2017 | Dukish | .................. | G08G 1/095 |
| 2019/0271123 A1* | 9/2019 | Dolinar | .................... | E01C 23/22 |
| 2024/0160871 A1* | 5/2024 | Kovarik | ............. | G06K 7/10376 |

FOREIGN PATENT DOCUMENTS

| | | | | |
|---|---|---|---|---|
| CA | 3072049 A1 * | 4/2019 | ................ | B61L 1/14 |
| CN | 203759873 U * | 8/2014 | | |

OTHER PUBLICATIONS

Bouzakis, Antonios et al., Position Tracking for Passive UHF RFID Tags with the Aid of a Scanned Array, Int J Wireless Inf Networks (2013) 20:318-327 (Year: 2013).*
Chen, A Passive UHF RFID Tag Antenna For Road Marker Navigation Application, Department of Electrical Engineering, Georgia Southern University, (2015) hereinafter "Chen"). (Year: 2015).*

* cited by examiner

*Primary Examiner* — Jean Paul Cass
(74) *Attorney, Agent, or Firm* — Hugh P. Gortler

(57) ABSTRACT

An apparatus includes a pavement marker configured to be mounted to a road at a lane line of a lane at known orientation with respect to the lane line; and an RF device carried by the raised pavement marker. The RF device is configured to transmit a directional RF navigation signal and it is positioned relative to the known orientation to transmit the signal across the lane in a direction that is substantially normal to the lane line.

24 Claims, 13 Drawing Sheets

FIG. 3A
FIG. 3C
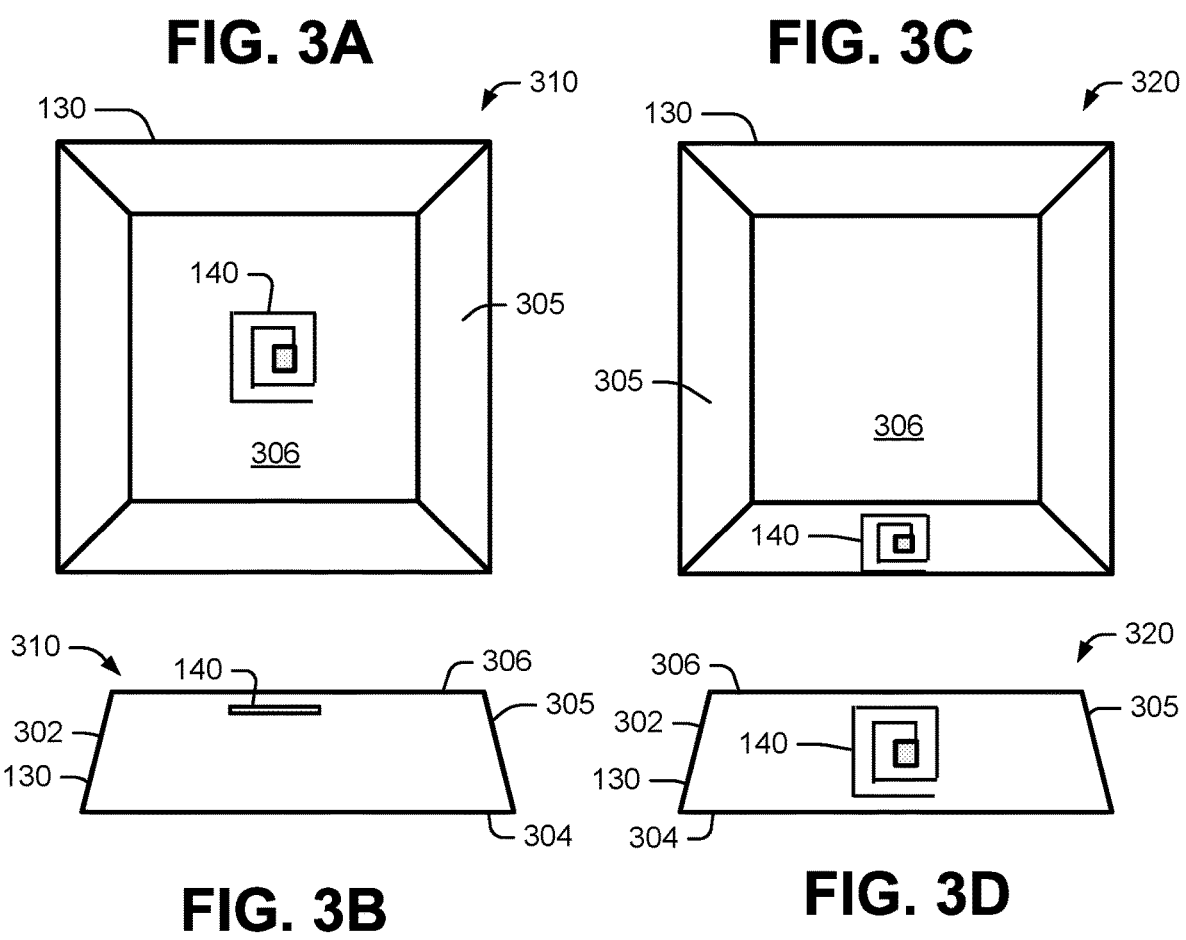
FIG. 3B
FIG. 3D
FIG. 3E
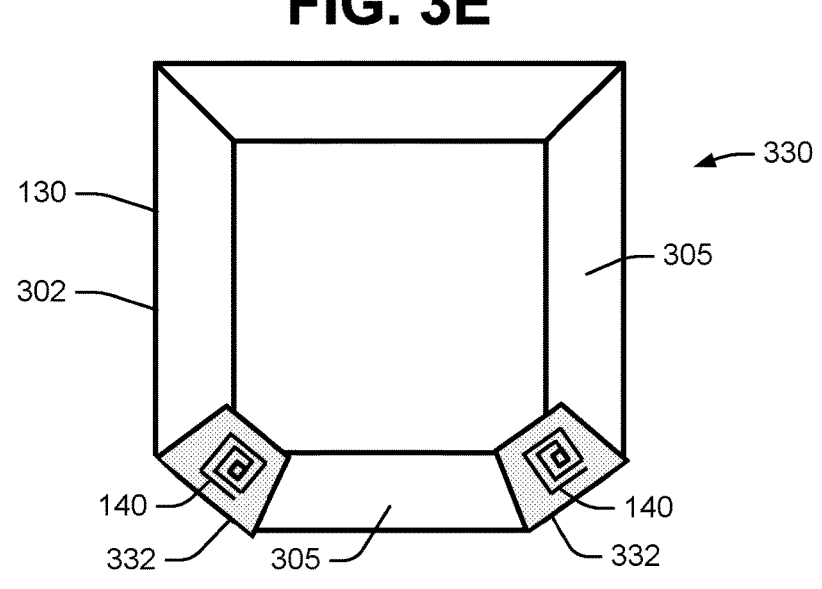

FIG. 6

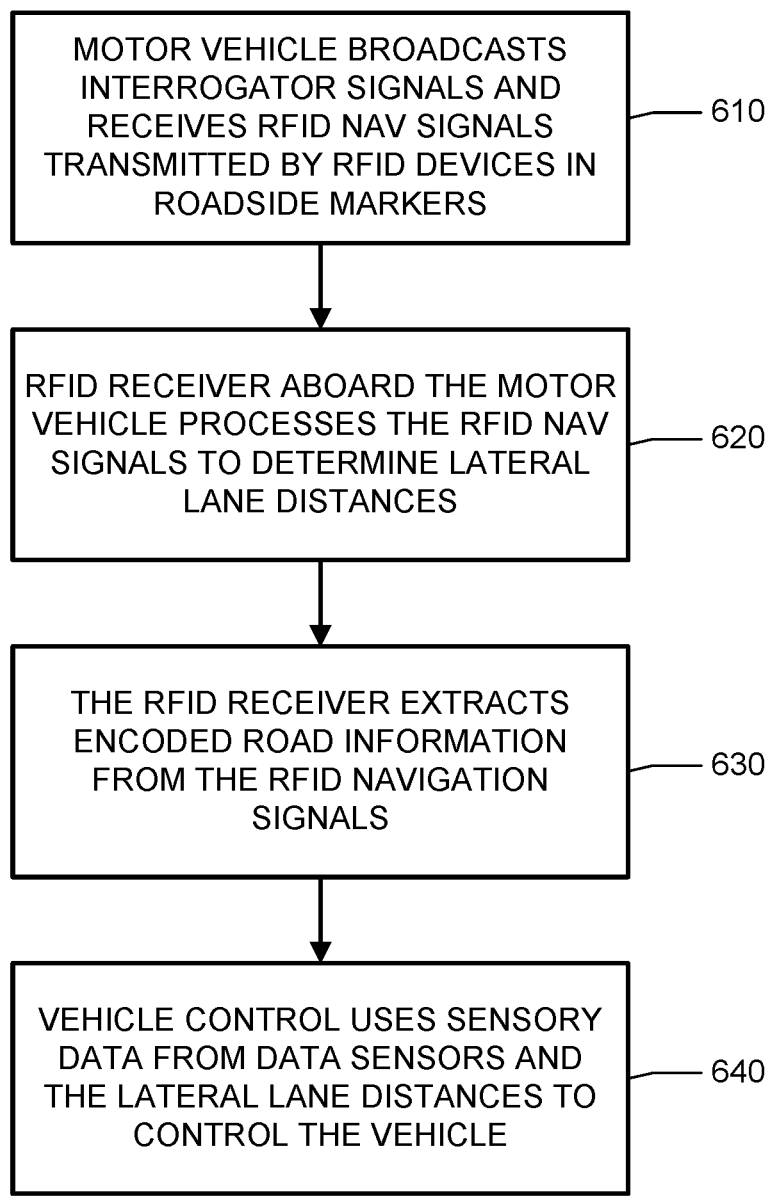

MOTOR VEHICLE BROADCASTS INTERROGATOR SIGNALS AND RECEIVES RFID NAV SIGNALS TRANSMITTED BY RFID DEVICES IN ROADSIDE MARKERS — 610

RFID RECEIVER ABOARD THE MOTOR VEHICLE PROCESSES THE RFID NAV SIGNALS TO DETERMINE LATERAL LANE DISTANCES — 620

THE RFID RECEIVER EXTRACTS ENCODED ROAD INFORMATION FROM THE RFID NAVIGATION SIGNALS — 630

VEHICLE CONTROL USES SENSORY DATA FROM DATA SENSORS AND THE LATERAL LANE DISTANCES TO CONTROL THE VEHICLE — 640

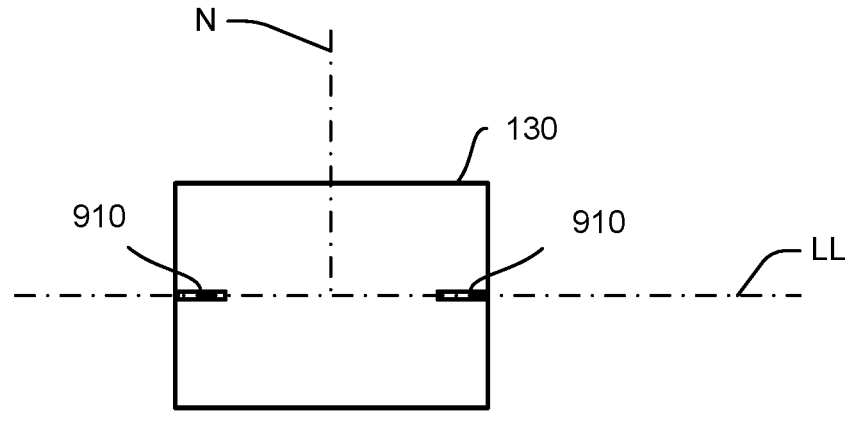
FIG. 9
FIG. 19
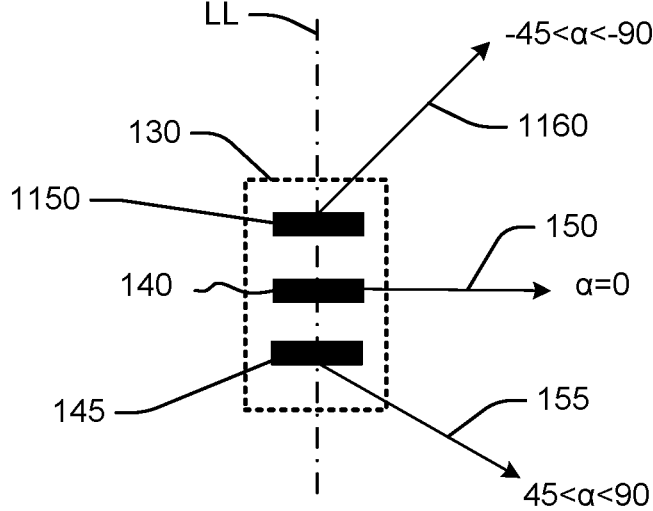

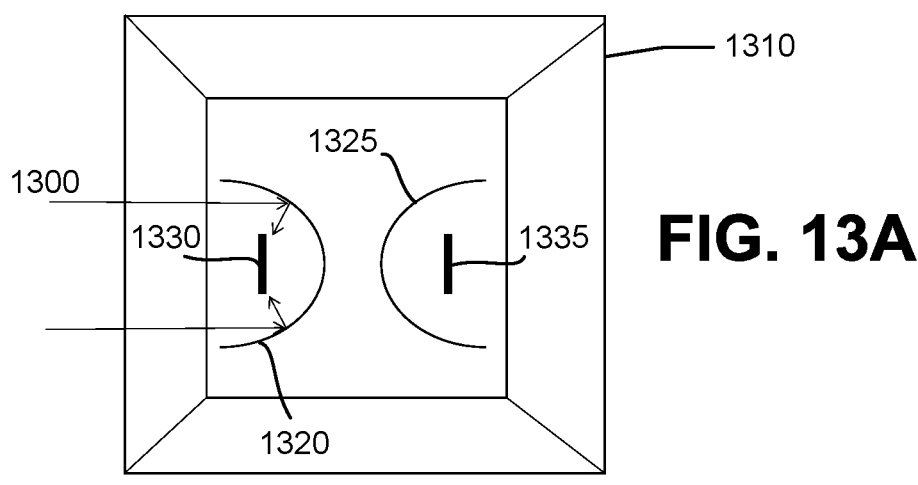
FIG. 13A
FIG. 13B
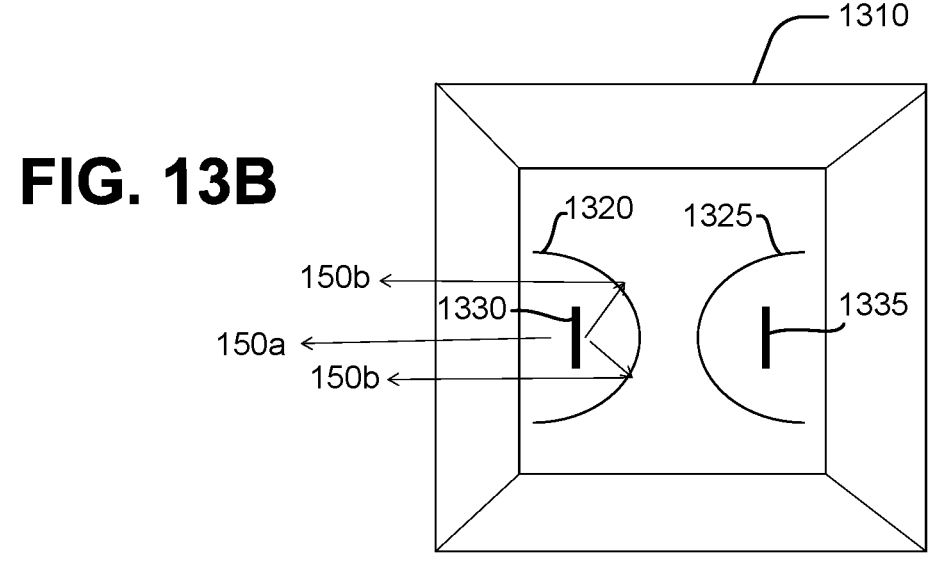
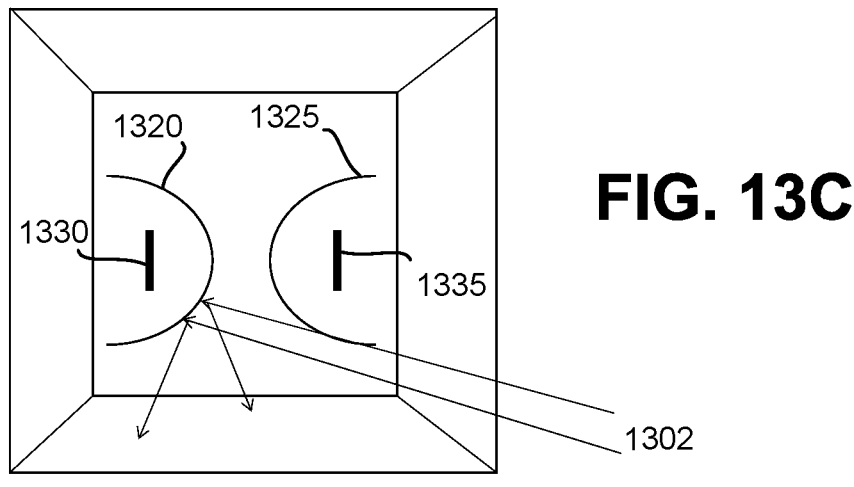
FIG. 13C

RF NAVIGATION FOR MOTOR VEHICLES

BRIEF DESCRIPTION OF THE DRAWINGS

FIGS. 3A and 3B are illustrations of an apparatus for the transit system, the apparatus including a raised pavement reflector and a mounted RFID device.

FIGS. 3C and 3D are illustrations of an apparatus for the transit system, the apparatus including a raised pavement reflector and a mounted RFID device.

FIG. 3E is an illustration of an apparatus for the transit system, the apparatus including a raised pavement reflector and two mounted RFID devices.

FIG. 6 is an illustration of a method of operating the motor vehicle of FIG. 5.

FIG. 9 is an illustration of an apparatus including a pavement marker installed at a lane line on a road.

FIGS. 13A-13C are illustrations of an apparatus including a pavement marker, first and second RFID devices having directional antennae, and first and second parabolic reflectors.

FIG. 19 is an illustration of a pavement marker carrying multiple RF devices that transmit RF signals at different transmission angles.

DETAILED DESCRIPTION

Figure 1:
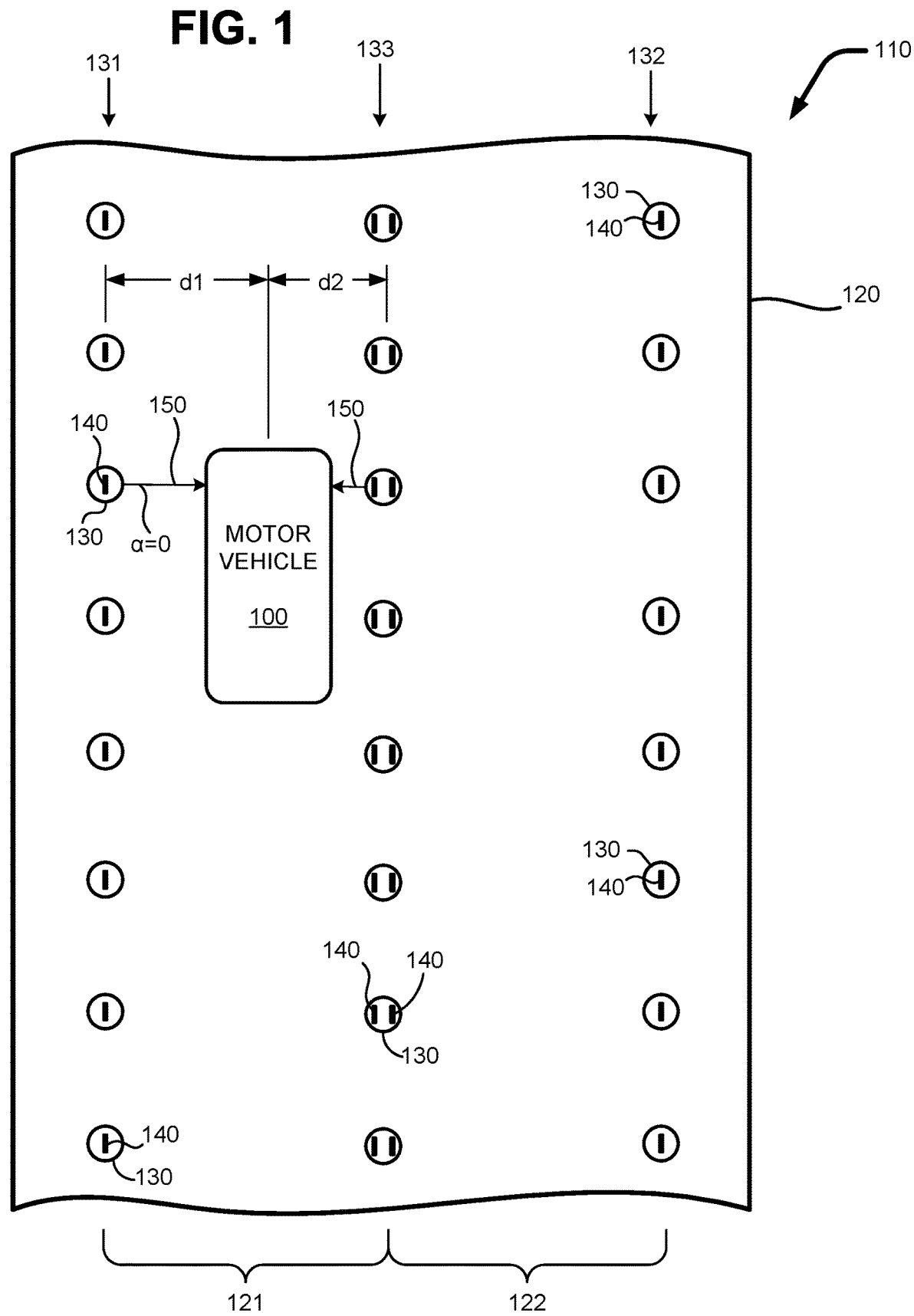
FIG. 1 is an illustration of a transit system for motor vehicles.

Reference is made to FIG. 1, which illustrates a transit system 110 for motor vehicles 100. The transit system 110 includes a road 120, and a plurality of pavement markers 130 spaced apart along the road 120. The pavement markers 130 form lane lines 131, 132 and 133, which define lanes 121 and 122 of the road 120. Examples of the pavement markers 130 include raised pavement markers such as Bott's dots, raised pavement reflectors, cats eyes, and delineators. An example of a pavement marker 130 that is not a raised pavement marker is pavement marking tape.

The pavement markers 130 may be raised above, recessed, or embedded in the road 120 (or any combination thereof). In areas where snow is expected n the colder seasons, raised pavement markers and pavement marking tape may be recessed so as not to be displaced by snow-plows.

A plurality of RFID devices 140 are carried by the pavement markers 130. The RFID devices 140 are also spaced apart along the road 120. The RFID devices 140 are configured to generate and transmit directional RFID navigation signals 150 across the road 120. A pavement marker 130 at the edge of the road 120 may carry only a single RFID device 140. A pavement marker 130 that defines two adjacent lanes may include first and second RFID devices 140. The first RFID device 140 generates and transmits a directional RFID navigation signal 150 across one of the lanes, and the second RFID device 140 generates and transmits a directional RFID navigation signal 150 across the other of the lanes. For instance, each of the pavement markers 130 forming the middle lane line 133 may carry two RFID devices 140: one for transmitting an RFID navigation signal 150 into the left lane 121, and the other for transmitting an RFID navigation signal 150 into the right lane 122.

In some configurations, the pavement markers 130 at the edges of the road 120 carry RFID devices 140 that transmit RFID navigation signals 150, but the pavement markers 130 that define adjacent lanes do not carry any RFID devices 140. In other configurations, first and second RFID devices 140 are carried by the pavement markers 130 that define adjacent lanes, but the pavement markers 130 at the edges of the road 120 do not carry any RFID devices 140.

The RFID devices 140 may be passive, active or any combination thereof. Active RFID devices 140 include their own power source, or they draw power from a power source carried by its corresponding pavement marker 130. For instance, the pavement marker 130 may carry a battery, or it may carry solar cells.

Passive RFID devices 140 harvest power from interrogator signals to generate and transmit the RFID navigation signals 150. As used herein, passive RFID devices 140 include semi-passive devices, which also harvest power from the interrogator signals. Interrogator signals may be generated by the vehicles 100.

Active RFID devices 140 may periodically generate RFID navigation signals 150. Active RFID devices 140 may also have a greater transmit range than passive RFID devices 140.

Figure 2A:
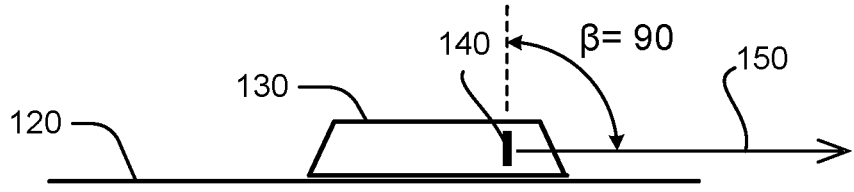
FIG. 2A is an illustration of an RFID device that is carried by a pavement marker that is mounted on a road.
Figure 2B:
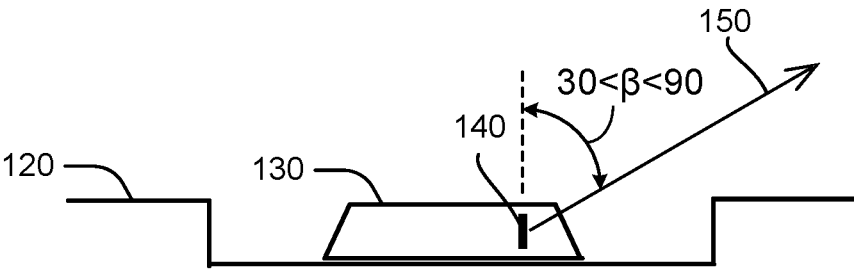
FIG. 2B is an illustration of an RFID device that is carried by a pavement marker that is recessed in a road.

Reference is made to FIGS. 2A and 2B. The direction of the transmission of the RFID navigation signal 150 may be characterized by an incline angle β that is measured with respect to the normal to the road 120. The pavement marker 130 has a surface that is mounted to the road 120. Thus, a normal to this mounting surface is also known to be normal to the road 120. At an incline angle of β=0 degrees, the RFID navigation signal 150 is transmitted in a direction that is normal to the road 120. At an incline angle of β=90 degrees, the RFID navigation signal 150 is transmitted parallel to the plane of the road 120. Typically, the incline angle β will be between 30 and 90 degrees.

FIG. 2A illustrates an incline angle β of about 90 degrees for a pavement marker 130 that is mounted on the road 120. FIG. 2B illustrates an incline angle β for a pavement marker 130 that is recessed in the road 120. An incline angle of 30<β<90 allows the RFID navigation signal 150 to cross a lane of the road 120 without being substantially blocked by the road 120. The incline angle β may be selected to optimize power of the RFID navigation signal 150 at an RFD receiver on the vehicle 100. For example, an incline angle of β=30 degrees might optimize power to an RFID receiver mounted atop the roof of the vehicle 100, while an incline angle of β=60 degrees might optimize power to an RFID receiver mounted at a wheel well of the vehicle 100.

Returning to FIG. 1, the direction of the RFID navigation signal 150 may be further characterized by a transmission angle α. At a transmission angle of α=0 degrees, the RFID navigation signal 150 is transmitted across the lane in a direction that is substantially normal (i.e., perpendicular) to the lane line. At this orientation, the RFID navigation signal 150 is said to have a zero degree transmission angle.

Range of the RFID navigation signals 150 is typically a function of such factors as transmit power, receive sensitivity and efficiency, antenna size, RF frequency, device orientation, and surroundings. In North America, the RFID device 140 may transmit at, for example, 902-928 MHz UHF ISM band, which can be adjusted to cover about 1 to 12 meters. These factors may be tailored to ensure that an RFID navigation signal 150 does not substantially extend beyond a single lane, or that the power has attenuated by the time it reaches the distance of an adjacent lane so as to be below a signal detection threshold in that adjacent lane. For example, RFID navigation signals 150 from RFID devices 140 along the lane line 131 have sufficient power to be detected at a motor vehicle 100 traveling down the lane 121 but is below the signal detection threshold of a motor vehicle 100 traveling down the lane 122.

As a motor vehicle 100 approaches or reaches a pavement marker 130, it receives an RFID navigation signal 150 from the RFID device 140 carried by that pavement marker 130. The motor vehicle 100 may process that RFID navigation signal 150 to determine a lateral lane distance of the motor vehicle 100 from a lane line. For instance, the motor vehicle 100 may use strength of signal ("SoS") or time of flight ("ToF") of the RFID navigation signal 150 to determine a lateral distance (d1) to a lane line. If pavement markers 130 are on opposite sides of the motor vehicle 100 (as illustrated in the example of FIG. 1) and the motor vehicle 100 receives RFID navigation signals 150 from its opposite sides, the motor vehicle 100 may use a differential ToF or a differential SoS to determine the lateral distance (d1−d2) of the motor vehicle 100 from the centerline of its lane.

As the motor vehicle 100 continues down the road 120 and passes additional pavement markers 130, it receives additional RFID navigation signals 150 and computes a sequence of lateral lane distances. A motor vehicle 100 that is partially or fully automated may use these lateral lane distances to make accurate real time adjustments to the steering of the motor vehicle 100. A vehicle 100 that is not automated may use these lateral lane distances to alert the driver that the motor vehicle 100 is drifting.

At least some of the RFID navigation signals 150 may also be encoded with road information. The encoded road information may include width of the lane, the position of a pavement marker 130 from the center of its associated lane, which enables the distance from the centerline to be determined from only the lateral distance d1. This is beneficial for lanes that are uneven or non-parallel.

The encoded road information may describe a lane border (which can identify the lane in which the motor vehicle 100 is located), and provide GPS information about the location of its corresponding pavement marker 130. The motor vehicle 100 may use the GPS position of a pavement marker 130 and the width of the lane to calculate the lane position. If the motor vehicle 100 receives RFID navigation signals 150 from opposite sides of a lane, the motor vehicle 100 may use the GPS positions of the pavement markers 130 to calculate the center lane position.

The encoded road information may further include upcoming traffic information such as distances to highway exits, stop signs, traffic lights, and intersections. The encoded road information may include road topography, such as distance to changes in road curvatures and grades (e.g., the number of feet to the start of a turn with a curvature of a given radius; and the number of feet to the start of downgrade of a certain percentage). Traffic information such as road topography enables the motor vehicle 100 to know what is coming ahead, and plan for turns and other maneuvers.

Different classes of autonomous vehicles may use the RFID navigation signals 150 in different ways. Different countries may use different systems for classifying autonomous vehicles. In the United States, the National Highway Traffic Safety Administration (NHTSA) has proposed a formal classification system that involves five levels.

A motor vehicle 100 having a level 0 classification has no automation, but it may issue warnings. For instance, such a motor vehicle 100 may be equipped with a module that receives RFID navigation signals 150, and a processor that processes a sequence of the received RFID navigation signals 150 to determine whether the motor vehicle 100 is drifting in its lane. An audible alarm may be sounded if drifting occurs (unless a turn signal is activated or the motor vehicle 100 otherwise indicates that it is changing lanes). The encoded road information may be used by a navigation system aboard the motor vehicle 100 (e.g., a built-in navigation system, or a mobile application such as one based on Google Maps Navigation).

A motor vehicle 100 having a level 1 classification has function-specific automation. That is, one or more specific control functions are automated. Examples include electronic stability control or pre-charged brakes, where the motor vehicle 100 automatically assists with braking to enable the driver to regain control of the motor vehicle 100 or stop faster than possible by acting alone. A motor vehicle 100 having a level 1 classification may utilize the RFID navigations signals 150 in the same manner as a motor vehicle 100 having a level 0 classification.

A motor vehicle 100 having a level 2 classification has combined function automation. At least two primary control functions are designed to work in unison to relieve the driver of control of those functions. An example is adaptive cruise control in combination with lane centering. A motor vehicle 100 having a level 3 classification has limited self-driving automation. In such a motor vehicle 100, a driver can fully cede control of all safety-critical functions in certain conditions. Such a motor vehicle 100 can sense when conditions require the driver to retake control and can provide a "sufficiently comfortable transition time" for the driver to do so. For instance, the steering is performed by the vehicle's control until the driver retakes control.

A motor vehicle 100 having a level 2 classification or a level 3 classification may utilize the RFID navigation signals 150 to determine lateral lane distances and use the lateral lane distances to adjust steering in real time to maintain the position of the motor vehicle 100 in its lane. Even if the lane lines are obscured by snow, fog, or other environmental factors, the vehicle position may be maintained without ceding control to the driver.

A motor vehicle 100 having a level 3 classification may use the road information encoded in the RFID navigation signals 150 to set longer warning times when encountering road situations where the motor vehicle 100 needs to cede control to the driver. For instance, if the encoded road information indicates upcoming road work and lane closures, or sharp turns in the road ahead, the motor vehicle 100 can warn the driver that it will cede control in a comfortable time period, rather than ceding in an urgent manner when it encounters road conditions that it is unable to navigate safely.

A motor vehicle 100 having a level 4 classification has full self-driving automation. Destination or navigation input is provided at the beginning of a trip, but a driver is not expected to be available for control at any time during the trip. Thus, such a motor vehicle 100 may be driverless, and it may be occupied or unoccupied. A motor vehicle having a level 4 classification may utilize the RFID navigations signals 150 in the same manner as a vehicle having a level 3 classification, except that control is not ceded at any time to a driver. Thus, a motor vehicle 100 having a level 4 classification can use the RFID navigation signals 150 to maintain vehicle lane position, and it can use the encoded road information to plan for upcoming turns (e.g., reducing speed for an upcoming sharp turn), exits, lane changes, and other driving maneuvers, and plot a driving path.

For the transit system 110 of FIG. 1, a motor vehicle 100 traveling along the road 120 may broadcast interrogator signals in a forward direction. The range, strength and frequency of the interrogator signals may depend in part upon speed of the motor vehicle 100 and distance (along a lane) between pavement markers 130. An RFID device 140 ahead of the motor vehicle 100 receives an interrogator signal and responds by transmitting an RFID navigation signal 150. The motor vehicle 100 receives the navigation signal 150 as it approaches or reaches the RFID device 140.

The RF devices 130 may be spaced apart at a regular interval along the road 120. Although optimal, there is no need for each pavement marker 130 to carry an RFID device 140, and for each RFID device 140 to generate a navigation signal 150. As a first example, a group of pavement markers 130 are clustered together, and only one or a few of the pavement markers 130 in the group may carry an RFID device 140. As a second example, every $n^{th}$ pavement marker 130 along a lane carries an RFID device 140 (where integer n>1). As a third example, every pavement marker 130 carries an RFID device 140, but only every $M^{th}$ RFID device 140 is programmed to generate an RFID navigation signal 150 (where integer m>1).

The example of FIG. 1 shows a road 120 having two lanes 121 and 122, two outer lane lines 131 and 132 of pavement markers 130, and a middle lane line 133 of pavement markers 130. However, the transit system 110 is not so limited. Other roads 120 may have different numbers of lanes and lane lines. For instance, a road 120 might have a single lane and a single line of pavement markers 130 at one of the edges of that single lane.

Reference is made to FIG. 19. A pavement marker 130 may carry an RF device 145 for a function other than transmitting an RFID navigation signal 150. For example, a raised pavement marker 130 may carry an RFID device 140 for transmitting an RF navigation signal 150 at a zero degree transmission angle, and an RF device 145 for transmitting a directional RF information signal 155 at a non-zero degree transmission angle (e.g., a transmission angle α between 45 and 90 degrees) that enables a vehicle 100 to receive that RF information signal 155 before the vehicle 100 reaches the pavement marker 130. The RF information signal 155 may be used primarily to provide encoded road information to oncoming vehicles 100. The RFID navigation signal 150 and the RF information signal 155 may be transmitted at different frequencies.

FIGS. 3A to 3E illustrate three examples of an apparatus 310, 320 and 330 including a pavement marker 130 and at least one embedded RFID device 140. In each example 310, 320 and 330, the pavement marker 130 is a raised pavement reflector. The raised pavement reflector includes a reflector body 302 that is shown as being made of a translucent material (for illustrative purposes), but is typically made of plastic, ceramic or concrete. A bottom planar surface 304 of the reflector body 302 is secured to the road. The reflector body 302 also has angled surfaces 305 and an upper planar surface 306. Reflective material may be coated on one or more of the angled surfaces 305 of the reflector body 302, or reflectors may be epoxied to one or more of the angled surfaces 305. For instance, one of the angled surfaces 305 may be coated with red reflective material, and an opposite one of the angled surfaces 305 may be coated with an orange or white reflective material. The raised pavement reflector is installed such that the red reflective angled surface 305 is directed away from oncoming traffic to alert drivers who are driving on the wrong side of the road. The orange or white reflective angled surface 305 is directed toward oncoming traffic. The orange reflective angled surface 305 delineates either single or double, solid or intermittent, yellow lines. The white reflective angled surface 305 delineates solid or intermittent white lane lines. The RFID device 140 may encode this road information in the RF navigation signal 150 and/or the RF information signal 155. The raised pavement reflector may also include a lens or sheeting that covers the angled surfaces 305. The lens or sheeting enhances visibility by reflecting automotive headlights.

At least one RFID device 140 may be mounted at the angled and/or upper surfaces 305 and 306. If reflectors are epoxied to the reflector body 302, an RFID device 140 may instead be embedded in the epoxy.

When the raised pavement reflector is mounted to the road in the correct orientation, a driver will see the orange reflective surface when traveling in the correct direction, and the driver will see the red reflective surface if traveling in the wrong direction. Thus, the raised pavement marker is installed on the road in a known orientation with respect to a lane line. The RFID device 140 is positioned to transmit the navigation signal 150 at an angle relative to this known orientation and, therefore, at a substantially zero degree transmission angle relative to the lane line. Indicia such as markings may be added to the raised pavement marker to properly orient the raised pavement reflector with respect to a lane line.

FIGS. 3A and 3B illustrate top and side views, respectively, of the first example 310. The RFID device 140 may be mounted underneath the upper planar surface 306. The position of the RFID device 140 shown in FIGS. 3A and 3B is not limiting.

FIGS. 3C and 3D illustrate top and side views, respectively, of the second example 320. The RFID device 140 is surface mounted underneath one of the angled surface 305 of the reflector body 302. The position of the RFID device 140 shown in FIGS. 3C and 3D is not limiting.

FIG. 3E illustrates a top view of the third example 330, in which the reflector body 302 is cut on corners 332 facing oncoming motor vehicles 100. An RFID device 140 is mounted underneath each cut corner 332 The RFID devices 140 may be oriented to face adjacent lanes to create a higher signal to and from the RF device's antenna.

Another example of a raised pavement marker is a "cat's eye" (not illustrated), which may include two pairs of reflective glass spheres set into a flexible white rubber dome, mounted in a metal housing. The rubber dome may be occasionally deformed by passing traffic. One or more RFID devices 140 may be embedded in the spheres or attached to the metal housing.

Another example of a raised pavement marker is a "delineator" (not illustrated). A delineator is a tall pylon (similar to a traffic cone or bollards) mounted on a road surface, or along an edge of a road. Delineators are typically used to channelize traffic. One or more RFID devices 140 may be attached to the base or the pylon.

Yet another example of a raised pavement marker is a Bott's dot (not illustrated). A typical Bott's dot is semi-hemispherical and made of ceramic or plastic. A flat surface of the Bott's dot is secured to the road 120. At least one RFID device 140 is embedded within the Bott's dot to transmit an RF navigation signal 150 at the appropriate incline and transmission angles. RF signals penetrate cement, ceramic and plastic in the length scales of Bott's dots.

Reference is now made to FIG. 9. The RFID devices 140 may be embedded, mounted or integrated with the pavement markers 130 during manufacture of the pavement markers 130. The pavement markers 130 may have markings 910 for aligning the pavement markers 130 with a lane line LL during installation. These markings 910 also establish a normal N to the lane line LL. The RFID device is positioned so that the RF navigation signal will be transmitted along the normal N and therefore perpendicular to the lane LL. In this manner, the pavement marker 130 is configured to be mounted to a lane line LL at a known orientation, and the RF device 140 is positioned relative to the known orientation to transmit the RF navigation signal 150 in a direction that is substantially normal to the lane line LL.

Pavement markers 130 already on a road may be retrofitted to carry the RFID devices 140. A pavement marker 130 may be retrofitted, for instance, by boring a small hole, embedding the RFID device 140 in the hole, and either filling the hole with epoxy or covering the hole with tar or another material. Alternatively, the RFID device 140 may be pre-manufactured within a housing, and the housing is inserted into the hole.

Figure 10A:
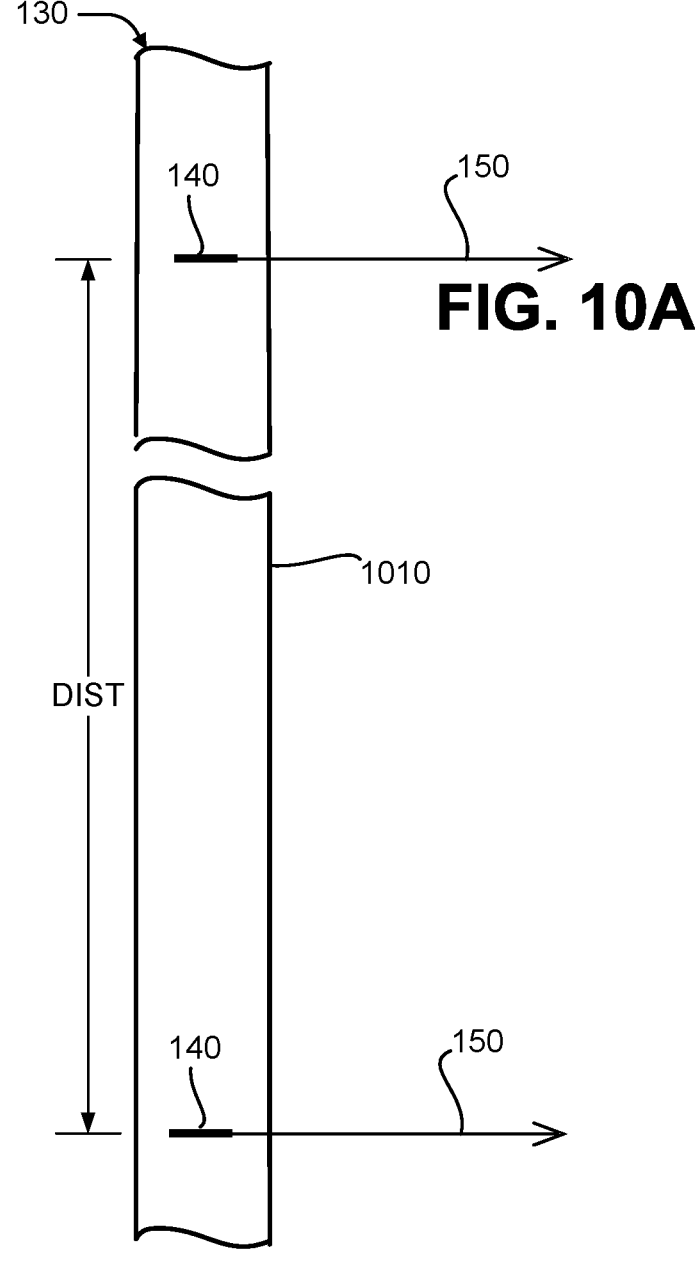
FIGS. 10A and 10B are illustrations of an apparatus including pavement marking tape and RFID devices.
Figure 10B:
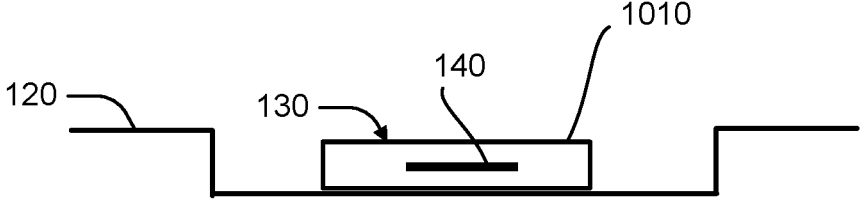

Reference is now made to FIGS. 10A and 10B, which illustrate a pavement marker 130 including pavement marking tape 1010. The pavement marking tape 1010 may be a self-adhesive tape that incorporates reflective materials to mark lanes and road edges. When applied to the road 120, the tape 1010 sits flush with a surface of the road 120 or it sits slightly below the road surface if recessed in the road (FIG. 10B illustrates the tape 1010 recessed in the road 120). The RFID devices 140 may be mounted to the pavement marking tape 910 prior to applying the tape 1010. For instance, a plurality of the RFID devices 140 may be mounted (e.g., bonded) to the tape 1010 during manufacture such that the RF navigation signals 150 are at a substantially zero degree transmission angle with respect to a normal to an edge of the tape 1010. The incline angle will depend on whether the tape 1010 is mounted on the road surface or recessed in the road. The RF devices 140 may be spaced apart at a regular distance DIST. The tape 1010 may then be rolled up and sold.

During road construction, the tape 1010 is applied to the road 120 with the RFID devices 140 already in the proper orientations. Advantageously, aligning markers 910 with a lane line is eliminated. Alternatively, the RFID devices 140 may be secured to the road 120 in the proper orientation and spacing, and the tape 1010 is applied over the RFID devices 140.

The transit system 110 is not limited to pavement markers 130 that carry RF devices 140. The RFID devices 140 may be carried by roadside markers such as guard rails and k-rails. The RFID devices 140 may be attached to the surface of k-rails or embedded in the k-rail material at the time of manufacture. The RFID devices 140 may be mounted on housings on the posts of the guard rails, or on another surface. The RFID devices 140 may be secured to or embedded in the posts, for example, by epoxying the device housings of the RF devices 140 to the posts or by boring holes in the posts and inserting the RFID devices 140, with or without their device housings.

Figure 4:
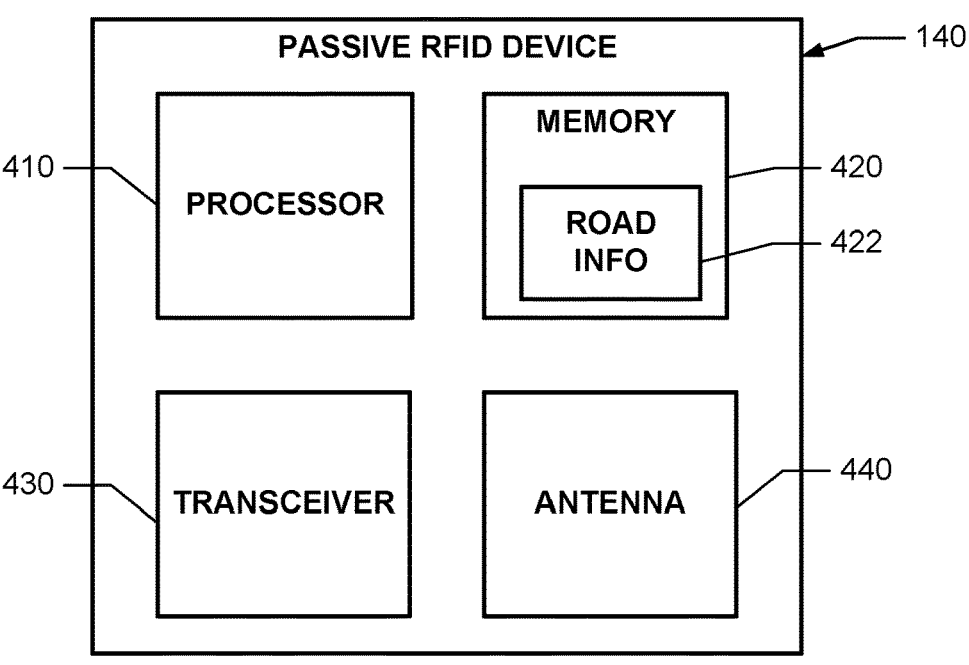
FIG. 4 is an illustration of a passive RFID device for the apparatus.

Reference is made to FIG. 4, which illustrates functional components of a passive RFID device 140 including a processor 410, machine-readable memory 420, transceiver 430, and a directional antenna 440. Road information 422 may be stored in the memory 420. The transceiver 430 receives an interrogator signal via the antenna 440, which powers the processor 410 to generate an RFID navigation signal, and send the RFID navigation signal to the transceiver 430. The transceiver 430 then transmits the RFID navigation signal via the antenna 440.

The directional antenna 440 emits the RFID navigation signal 150 in substantially one direction, preferably along a single lobe. Peak power is at the center of the lobe.

The directional antenna 440 offers one way of creating a directional RFID navigation signal 150. As discussed below, a directional RFID navigation signal 150 may instead by generated by the combination of an omnidirectional (isotropic) antenna and a parabolic reflector.

The RFID devices 140 may be configured to receive messages or data from RFID printers, and store information contained in those messages or data. For instance, if any exit is closed due to maintenance, this exit closure information may be wirelessly downloaded or printed to the RFID devices of those pavement markers 130 preceding the closed exit.

The GPS locations of the RFID devices 140 may be measured and printed in the memory 420 after the RFID devices 140 have been installed in the road 120. The GPS locations may have high accuracy if measured with two GPS frequencies and/or if augmentation equipment is used.

The high accuracy GPS locations may be encoded in the RF navigation signals 150 and sent to the vehicles 100. As a result, the RF navigation signals 150 provide the vehicles 100 with high-accuracy GPS data, which can be far more accurate than the GPS locations obtained by the (relatively low cost) GPS receivers in vehicles. And unlike the GPS locations from receivers, the GPS locations from the RFID devices 140 are not degraded in areas with weak satellite signals or high levels of interference, or in the presence of errors in the satellite orbit data. Thus, the GPS locations stored in the RFID devices 140 gives vehicles 100 access to location data that is local, reliable, and extremely accurate.

This higher accuracy has additional benefits for an autonomous vehicle. Given the higher location accuracy, the autonomous vehicle can determine which lane it is driving in. This, in turn, makes planning a route and executing a lane change safer.

Write Once Read Only (WORM) memory in the RFID devices 140 may be used for storing the GPS locations to prevent hacking. For instance, if a GPS satellite signal is jammed and emulated with false information, the observed GPS satellite information will not agree with the printed GPS information.

Figure 11:
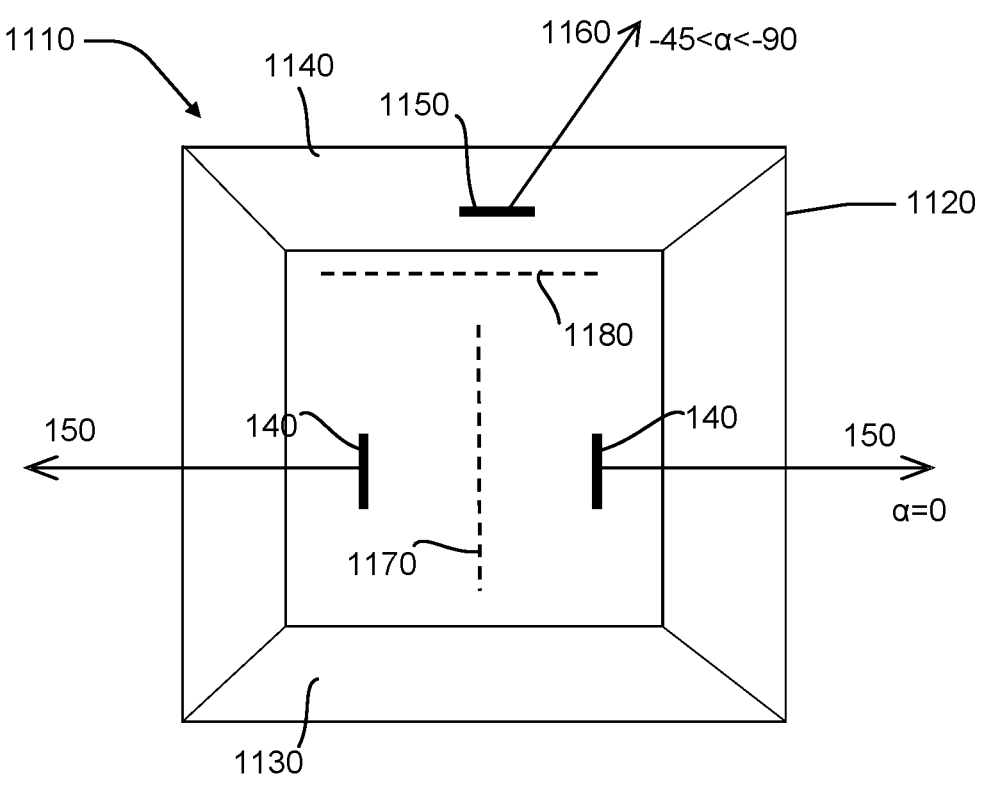
FIG. 11 is an illustration of an apparatus including a raised pavement marker and three RFID devices.

Reference is now made to FIG. 11, which illustrates an apparatus 1110 including a raised pavement reflector 1120 carrying first and second RFID devices 140. When installed at a lane line between two lanes, the first RFID device 140 transmits a first RF navigation signal 150 across one of the lanes at a substantially zero degree transmission angle, and the second RFID device 140 transmits a second RF navigation signal 150 across the other of the lanes in the opposite direction.

The raised pavement reflector 1120 may have an orange or white reflective surface 1130 facing oncoming traffic, and may have a red reflective surface 1140 on the opposite side to serve as a warning to any vehicle that is travelling on the wrong side of the road. Theses visual aids work best when head lights are shining on the reflective surfaces 1130 and 1140. They are not as effective during day time as a visual indicator to the vehicle operator (human or computer).

Additional reference is made to FIG. 19. To overcome this problem, the apparatus 1110 further includes a third RFID device 1150 for transmitting a directional warning signal 1160 at a transmission angle α between −45 and −90 degrees. The third RFID device 1150 may transmit the warning signal 1160 when interrogated by a vehicle traveling in the wrong direction (it will not receive an interrogator signal from a vehicle traveling in the correct direction). The vehicle receives this warning signal 1160 and, depending on the classification level of autonomy, takes an appropriate action. For instance, a level 0 vehicle might sound an audible alarm and activate a visual alarm on the dashboard. A level 4 vehicle might immediately move to the side of the road to get out of the way of oncoming traffic, and wait to execute a U-turn when it is safe to do so.

Figure 12:
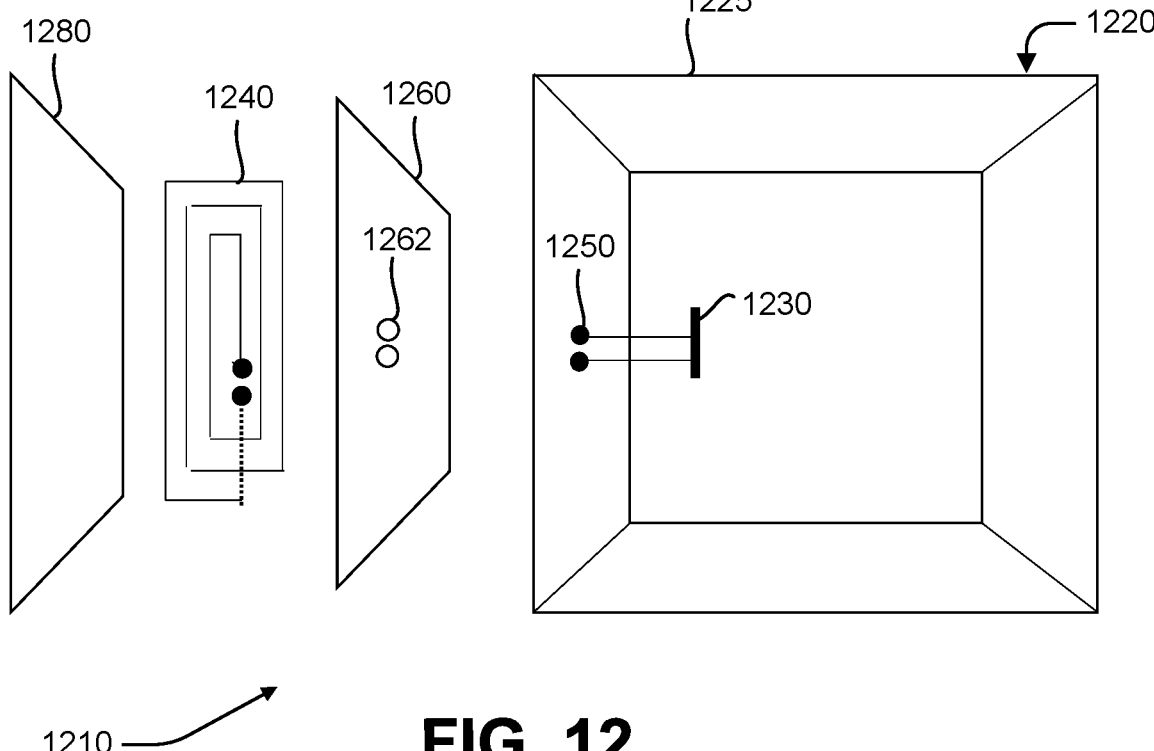
FIG. 12 is an illustration of an apparatus including a pavement marker and an RFID device including a chip and an off-chip antenna.

Reference is now made to FIG. 12, which illustrates an apparatus 1210 including a raised pavement reflector 1220, a raised pavement reflector cover 1280 (for simplicity, only the one side is shown) and an RFID device for transmitting a directional RFID navigation signal. The RFID device includes a chip 1230 having the processor, memory and transceiver. The chip 1230 may be mounted inside the body 1225 of the raised pavement reflector 1220 (as shown in FIG. 12). The RFID device further has a directional antenna 1240 that is separate from the chip 1230 (that is, off-chip). There is an interconnect 1250 between the chip 1230 and the antenna 1240. The interconnect 1250 has a structure that is strong enough to withstand stresses of manufacture while remaining highly conductive.

The apparatus 1210 of FIG. 12 may also include shielding 1260 between the antenna 1240 and the body 1225 of the raised pavement marker 1220. The shielding layer 1260 covers a portion of the body 1225 but does not cover the reflective surfaces. The shielding layer 1260 may have vias 1262 for facilitation of connecting the antenna 1240 to the interconnect 1250 to the chip 1230.

The antenna 1240 is between the body 1225 and the cover 1280. In configurations that do not include the shielding layer 1260, the antenna 1240 may be mounted (e.g., on a printed circuit board), etched or printed on either an edge face of the body 1225 or an inner surface of the cover 1280. In configurations that do include the shielding layer 1260, the antenna 1240 may be mounted, etched or printed on either an outer surface of the shielding layer 1260 or an inner surface of the cover 1280.

The antenna 1240 may be composed of a metallic material that is malleable and can be damaged, deformed or disconnected from the chip during integration with the raised pavement reflector 1220. The antenna 1240 has a connector of a size large enough that it can easily connect with the interconnector 1250. By forming the antenna 1240 on a surface of the raised pavement reflector 1220, the antenna 1240 may be larger than an antenna carried on a chip. The larger antenna 1240 provides a stronger signal to the chip 1230. It also allows for higher antenna sensitivity, reduces interrogator power requirements, and increases the available energy to the chip 1230 for a given interrogator signal strength.

In some configurations, the apparatus 1210 may further include one or more of the following: an RFID device for transmitting an RF navigation signal 150 across an adjacent lane; an RFID device for transmitting a road information signal 155; and an RFID device for transmitting a warning signal 1160. Each of these RFID devices may include a chip and an off-chip antenna.

Figures 14, 15, 16:
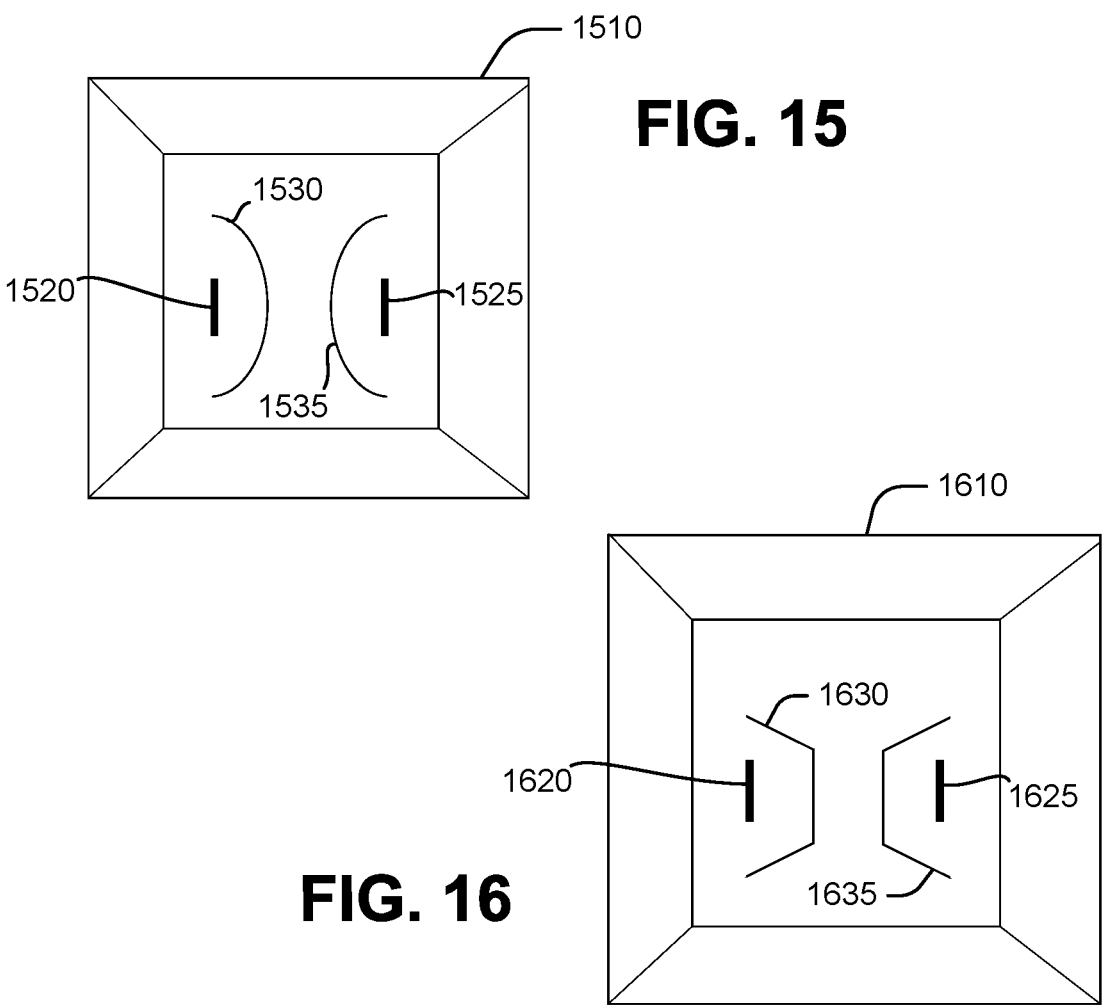
FIG. 14 is an illustration of an apparatus including a raised pavement marker, an RFID device having an omnidirectional antenna, and a parabolic reflector.
FIGS. 15 and 16 are illustrations of raised pavement markers that carry RFID devices and RF absorbers.

Transmit and reception performance of the RFID devices 140 may also be improved by the addition of RF reflectors. The RF reflectors can increase signal strength or improve directionality. FIGS. 13A to 14 provide examples of RF reflectors.

FIGS. 13A to 13C illustrate a raised pavement marker 1310 that carries first and second parabolic reflectors 1320 and 1325, and first and second RFID devices 1330 and 1335. A directional antenna of the first RFID device 1330 is at a focus of the first parabolic reflector 1320, and a directional antenna of the second RFID device 1335 is at a focus of the second parabolic reflector 1325.

As illustrated in FIG. 13A, the first parabolic reflector 1320 collects energy 1300 from an interrogator signal and focuses the collected energy onto the antenna of the first RFID device 1320. Thus, the reflector increases incoming signal strength.

As illustrated in FIG. 13B, an RF navigation signal 150 is broadcasted in response to the interrogator signal 1300. Energy 150*a* is directed in the same direction as the primary lobe, which is at a substantially zero degree transmission angle. Remaining energy is collimated. The collimated energy 150*b* is also transmitted at the substantially zero degree transmission angle.

The reflectors 1320 and 1325 can shield the RFID device 1330 and 1335 from unintended signals. For instance, interrogation signals might emanate from a vehicle in an adjacent lane.

As illustrated in FIG. 13C, the first parabolic reflector 1320 prevents spurious signals 1302 from reaching the first RFID device 1330. Instead, the backside of the first reflector 1320 scatters the spurious signals and diffuses signal strength such that it is below the signal detection threshold. (The signal detection threshold may be the smallest signal that can be detected by an RF receiver aboard a vehicle, or it may be a software limit, where the RF receiver ignores any signals below a specified signal strength.) Thus the parabolic reflectors 1320 and 1325 also function as shielding for the RFID devices 1330 and 1335.

In some configurations, a primary lobe is not transmitted at a substantially zero degree transmission angle. As a first example, a raised pavement marker carries an RFID device and a parabolic reflector. The RFID devices has a directional antenna, but the primary lobe is directed at the reflector. Energy 150*b* reflected by the reflector is predominantly collimated and transmitted at a substantially zero degree transmission angle.

FIG. 14 illustrates an example that does not involve a primary lobe. A raised pavement marker 1410 carries an RFID device 1420 and a parabolic reflector 1430. The RFID device 1420 has an omnidirectional antenna at the focus of the parabolic reflector 1430. Energy 1400 reflected by the parabolic reflector 1430 is predominantly collimated and transmitted at a substantially zero degree transmission angle.

Parabolic RF reflectors are preferred. However, the RF reflector may be substantially parabolic, or it may have some other geometry that can focus a substantial amount of incoming energy onto the antenna.

The RF reflectors may be solid or a mesh with appropriate opening that still reflects RFID signals. Examples of reflective materials include but are not limited to thin metal structures with high conductivity such as aluminum, copper and steel. Other factors that may affect the reflectivity of RF signals include thickness, shape, and surface roughness. For example, thin sheets of a smooth metal surface may be effective reflectors of RF signals. Thicker sheets may be less effective due to absorption of the electromagnetic waves. Similarly, a rough outer surface will dissipate the reflected signal. The exact thickness is a function of the skin depth of the metal, the incident angle, and the RF frequency. A metal thickness that achieves good reflection may be determined by the following equation:

$$t=(\text{skin depth})/(2*\cos(\text{incidence angle}))$$

where t is the thickness of the metal in meters, skin depth is the skin depth of the metal at the frequency of interest, and incidence angle is the angle at which the RF signal is incident on the metal.

Aluminum is a good RF reflective material for frequencies in the standard UHF range. If the signals are broadcast at a frequency of 900 MHz, for example, the skin depth of the aluminum is approximately 2.733 micro-meters. More generally, aluminum having a thickness of 4 μm or less will be a good reflector of RF signals, where incidence angle is less than 45 degrees.

Transmit and reception performance of the RFID devices 140 may also be improved by the addition of RF absorptive layers. FIG. 11 illustrates a first planar layer 1170 between the first and second RFID devices 140 and a second planar layer 1180 behind the third RFID device 1150. These layers 1170 and 1180 prevent stray and unintended signals from reaching the RFID devices 140 and 1150. The second planar 1180 layer blocks an interrogator signal from a vehicle traveling in the wrong direction from reaching the first and second RFID devices 140, and it also blocks interrogator signals from oncoming traffic from activating the third RFID device 1150. The first planar layer 1170 blocks stray signals and it blocks interrogator signals from adjacent lanes from reaching unintended RFID devices 140 and 1150.

An RF absorptive layer herein is not limited to a planar geometry. Other geometries may be used. FIGS. 15 and 16 illustrate two examples of RF absorptive layers that are not planar. The raised pavement marker 1510 of FIG. 15 carries first and second RFID devices 1520 and 1525 and corresponding first and second RF absorptive layers 1530 and 1535 that are arcuate. The raised pavement marker 1610 of FIG. 16 carries first and second RFID devices 1620 and 1625 and corresponding first and second RF absorptive layers 1630 and 1635 that are angled.

Absorptive materials include, but are not limited to, thick or rough conductive metals such as copper, aluminum, and nickel alloy; carbon-based materials such as carbon fiber, graphite, and graphene; conductive polymers such as polyaniline and polypyrrole; and materials with low conductivity, such as low conductive plastics and rubber.

Absorptive layers may have certain advantages over shielding with respect to stray signals. Although the RFID signals hitting the outer surface of a parabolic reflector will distribute the reflected signal over a diffuse area, and thus greatly reducing the signal strength, it may be desirable to not have the spurious reflected signals from vehicles in adjacent lanes.

Figure 17:
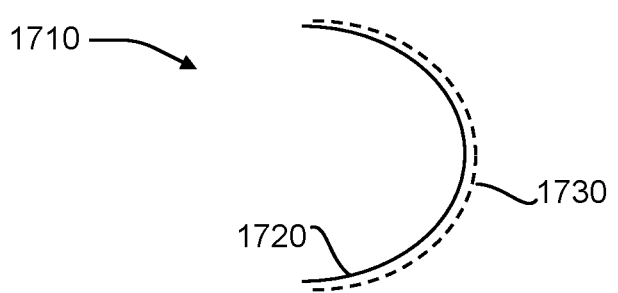
FIG. 17 is an illustration of a compound structure having an RF-reflective inner surface and an RF-absorptive outer surface.

Reference is now made to FIG. 17. A compound structure 1710 may be used in place of or in addition to absorptive layers and reflectors. An inner surface 1720 of the compound structure 1710 is RF-reflective, and an outer surface 1730 of the compound structure 1710 is RF-absorptive. In one example, an aluminum material of thickness less than 4 μm may be adhered or deposited to the backside of an absorber material and the compound structure formed into a parabola with the reflective material on the inner surface 1720. In another example, copper is a good RF reflector that in the 500 MHz to 1 GHz has a skin depth t between 2.916 μm and 2.062 μm. Copper material may be adhered or deposited at a thickness of about 2 μm on the backside of an absorber material, and the compound material formed into a parabola with the copper material on the inner surface 1720.

Figure 18:
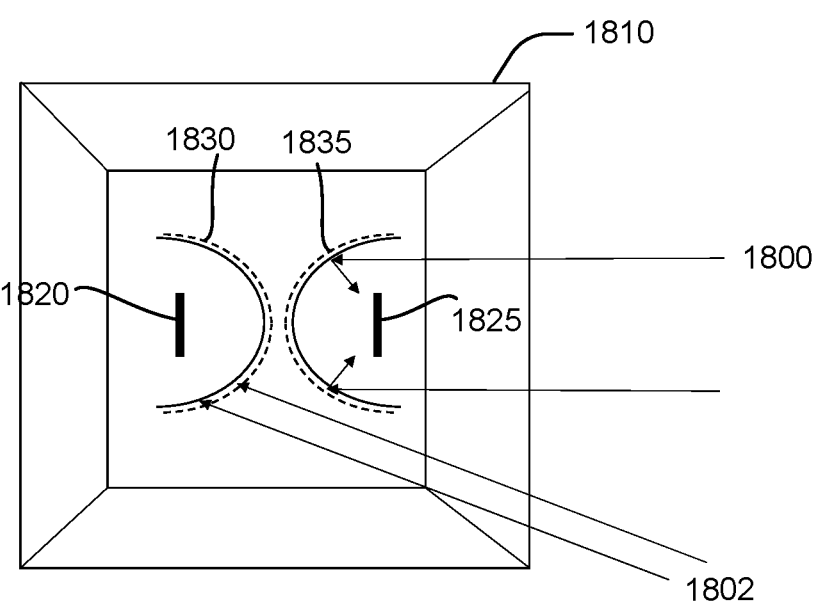
FIG. 18 is an illustration of an apparatus including a raised pavement marker, first and second RFID devices, and first and second compound structures.

FIG. 18 illustrates a raised pavement marker 1810 that carries first and second RFID devices 1820 and 1825 and first and second compound structures 1830 and 1835. The reflective inner surfaces of the compound structures 1830 and 1835 can focus incoming radiation 1800 onto the antennae of their corresponding RF devices 1820 and 1825, and collimate outbound signals. The absorptive outer surfaces of the compound structures 1830 and 1835 can prevent unintended signals 1802 from reaching the first and second RF devices 1820 and 1825.

Figure 5:
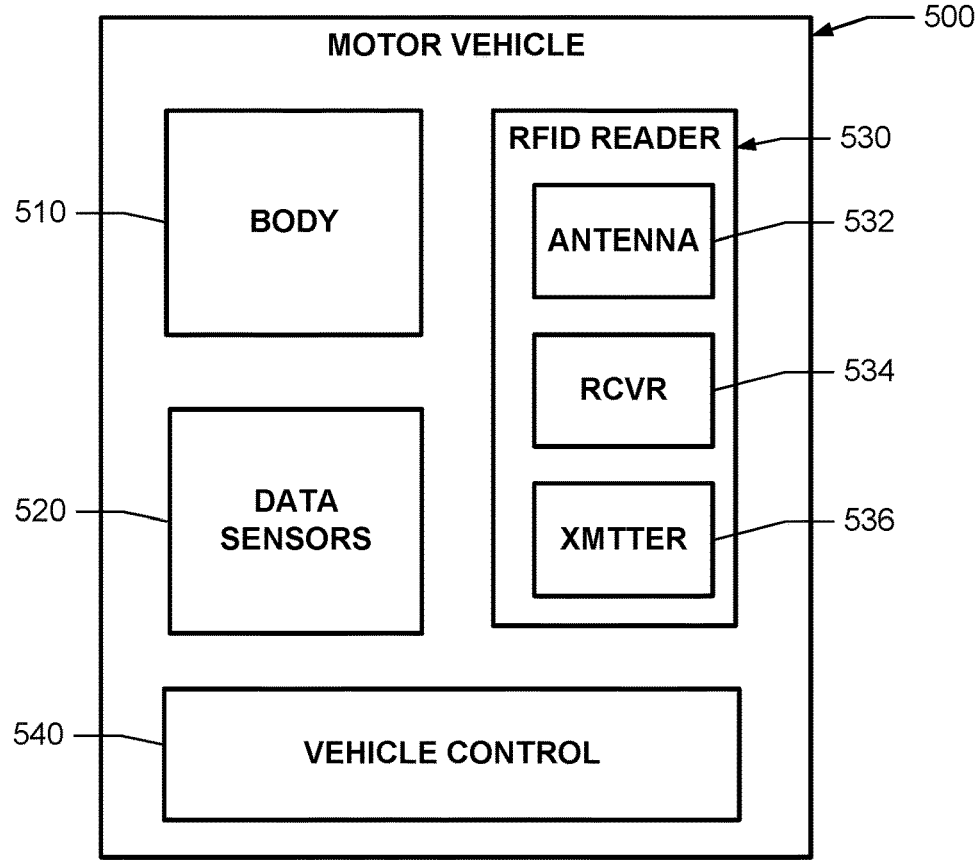
FIG. 5 is an illustration of a motor vehicle for navigating the transit system.

Reference is now made to FIG. 5, which illustrates a motor vehicle 500. Examples of the motor vehicle 500 include, but are not limited to, an automobile, motorcycle, utility vehicle, truck, and transport vehicle (e.g., bus, passenger van).

The motor vehicle 500 includes a body 510, data sensors 520, at least one RFID reader 530, and a vehicle control 540. (Other elements of the motor vehicle 500, including the engine and drive train, are not illustrated.) In the case of a motorcycle, the body 510 includes a frame. In the case of an automobile, the body 510 includes a chassis and an outer shell attached to a chassis.

The vehicle control 540 may be automated (resulting in an NHTSA classification of 1 or greater), or it may not be automated (resulting in an NHTSA classification of 0). A vehicle having a level 4 classification may be driverless.

The data sensors 520 generate sensory data for the motor vehicle control 540. Examples of the data sensors 520 include, but are not limited to, radar, lidar, GPS, odometry, and computer vision. The vehicle control 540 may use this sensory data for various functions including, but not limited to, distinguishing between different cars on the road, identifying signs, planning appropriate navigation paths, and collision avoidance.

The RFID reader 530 includes an antenna 532 mounted to the body 510 at a location for capturing the RFID navigation signals during movement of the motor vehicle 500. The RFID reader 530 further includes an RFID receiver 534 for processing the captured RFID navigation signals to determine lateral lane distances of the motor vehicle 500 during movement of the motor vehicle 500. The RFID receiver 534 may also extract encoded road information from the captured RFID navigation signals.

The RFID reader 530 may be active or passive. If the RFID devices are active, the RFID reader 530 may be passive or active. If the RFID devices are passive, then the RFID reader 530 may be active. The vehicle 500 may supply power to an RFID reader 530 that is active. An RFID reader 530 that is active may also have a transmitter 536 for transmitting interrogator signals via the antenna 532 during movement of the motor vehicle 500.

The RFID reader 530 of FIG. 5 is illustrated in terms of functionality. The receiver 534 and the transmitter 536 may be integrated into a single transceiver, or they may be implemented as separate components. The receiver 534 and the transmitter 536 may each have processing capability, or each may have an external dedicated processor, or they may share a common processor. The RFID reader 530 may contain more than one receiver, which may operate at the same or different frequencies.

Additional reference is made to FIG. 6, which illustrates a method in which the motor vehicle 500 is controlled to move along a road marked with roadside markers. At least some of the roadside markers carry passive RFID devices that broadcast RFID navigation signals when interrogated.

At block 610, as the motor vehicle 500 moves along the road in a forward direction, it broadcasts interrogator signals and it receives RFID navigation signals transmitted by the interrogated RFID devices 140. The interrogator signal may be broadcast continuously or in timed radio pulses.

At block 620, the RFID receiver 534 processes the RFID navigation signals to determine lateral lane distances of the motor vehicle 500. If the RFID navigation signals are received from only one side of a lane, absolute distance from a lane line may be determined. If the RFID navigation signals are received from opposite sides of a lane, a differential signal can be used to determine the distance from the lane's centerline.

The processing of the RFID navigation signals may also include measures to prevent false information or interference from other vehicles on the road. For instance, the motor vehicle 100 has an identifier and/or identifying handshaking signal (e.g., a series of short or long pulses), which are reflected by the roadside markers. Thus, the RFID reader 530 only listens to the navigation signal returned in response to the handshaking signal.

At block 630, the RFID receiver 534 may also extract any encoded road information from the RFID navigation signals.

At block 640, the vehicle control 540 uses sensory data from the data sensors 520 and the lateral lane distances from the RFID reader 530 to control the motor vehicle 500. For example, an automated vehicle control 540 can use the lateral lane distances to steer the motor vehicle 500 (e.g., center the motor vehicle 500 in a lane), and it can use the road information to plan for upcoming maneuvers and plot a driving path. The vehicle control 540 can use information such as identification of next exit, and distance to next exit, to safely execute lane changes to position the motor vehicle 500 to take the exit when it approaches the exit. It can use information such as lane closures to navigate the motor vehicle 500 to lanes that are open to traffic.

In some configurations, the RFID reader 530 may determine optimal frequency or period of interrogation as a function of distance between pavement markers and speed of the motor vehicle 500. The distance may be known in advance, or the distance may determine in real time (e.g., from the time of flight or GPS location information broadcast from the roadside markers). If the roadside markers are x feet apart, and the motor vehicle 500 is moving at a speed of y feet per second, then the interrogation signal may be broadcast at an optimal period of once per x/y seconds. If the distance is not known in advance, the interrogation signals may be broadcast at a high frequency to determine the position of the highest signal detected from the roadside markers, and then adjust the interrogation frequency to the optimal frequency.

The motor vehicle 500 may have one or more of the RFID readers 530 for generating the interrogator signals and capturing the RFID navigation signals. Interrogation by multiple RFID readers 530 delivers more power to passive RFID devices. Interrogation by multiple RFID readers 530 also allows greater control of the angle of the interrogation signal relative to the roadside markers. Whereas a single RFID reader 530 at the front center of the motor vehicle 500 is positioned forward to interrogate both sides of the lane, RFID readers 530 on opposite sides of the motor vehicle 500 may be angled to see the roadside markers coming ahead and can anticipate locations and changes in lane curvature.

Figure 7:
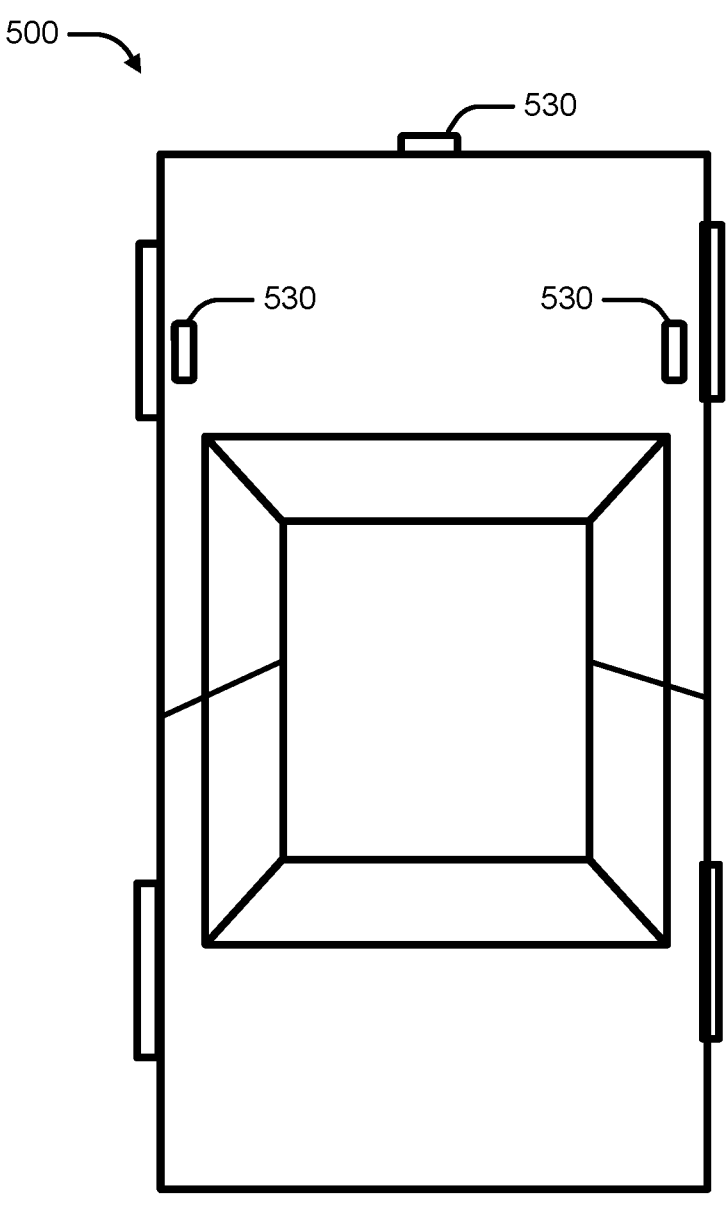
FIGS. 7 and 8 are illustrations of different configurations of the motor vehicle of FIG. 5.
Figure 8:
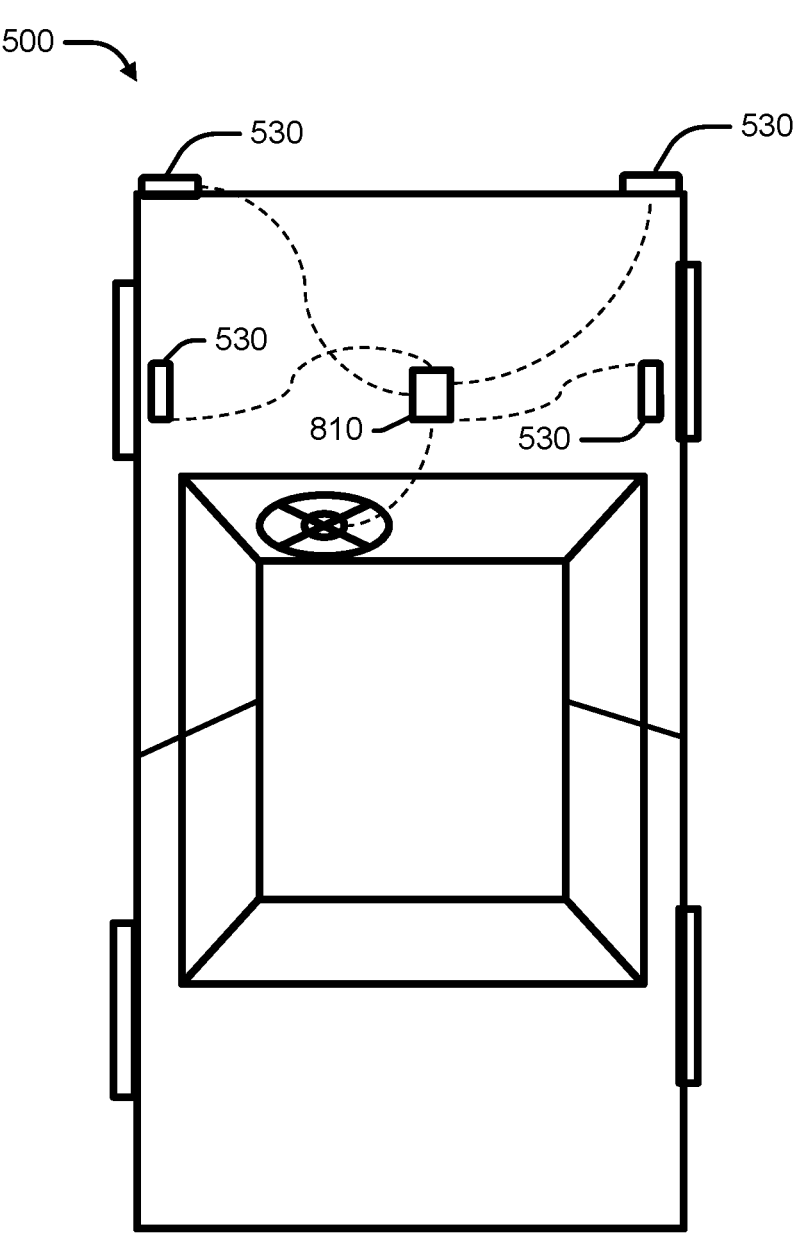

FIGS. 7 and 8 illustrate different configurations of the motor vehicle 500. In the configuration of FIG. 7, an RFID reader 530 is mounted to the front center of the motor vehicle 500, and two other RFID readers 530 are mounted on the opposite sides of the motor vehicle 500 (e.g., in wheel wells of the motor vehicle 500). In the configuration of FIG. 8, two RFID readers 530 are mounted to the front of the motor vehicle 500, and two other RFID readers 530 are mounted on the opposite sides of the motor vehicle 500. These configurations enable multiple interrogations in a forward direction.

In the configuration of FIG. 8, the RFID readers 530 do not process the received RFID signals. Instead, the RFID readers 530 are electrically connected to a shared processor 810, which performs the processing. The shared processor 810 may or may not share other vehicle functions such as steering, braking, navigation calculation, GPS positioning, etc.

The motor vehicle 500 is not limited to the configurations illustrated in FIGS. 7 and 8. In another configuration, the motor vehicle 500 may have only a single RFID reader 530 located at the front. In yet another configuration, the motor vehicle 500 may have only RFID readers 530 on opposite sides. In still another configuration, the motor vehicle 500 may have one or more RFID readers 530 mounted at the back of the motor vehicle 500. Other configurations may have additional RFID readers 530 at strategic locations for better signal reception.

If the motor vehicle 500 has a reader configured for another purpose, that reader may be adapted to read and process the RF navigation signals. This makes it possible to retrofit a vehicle to function as a level 0 or level 1 classification vehicle that can give a dashboard warning or sound an alarm when the vehicle is drifting.

In other configurations of the motor vehicle 500, the RFID readers 530 may be placed at other positions from which they can interrogate and receive the RFID navigation signals from the RFID devices in the roadside markers. For instance, there may be ports intentionally designed into the body 510 of the motor vehicle 500 for the express purpose of mounting the RFID readers 530. Or, if the motor vehicle 500 has a sensor package (e.g., lidar, radar) mounted to its roof, an RFID reader 530 may be included with the sensor package on the roof. If the vehicle has ports for cameras on the body of the vehicle, an RFID reader 530 may be mounted next to the cameras.

In other configurations, the motor vehicle 500 might have other systems that communicate via RF signals. For instance, the vehicle 500 might use RF signals for parking assist, keyless entry, collision avoidance systems and safety systems. RF receivers of these systems may also be configured to receive and process RF navigation signals, road information signals, and wrong-way warning signals. RF transmitters of these systems may also be configured to interrogate the RFID devices carried by the pavement markers.

Thus disclosed is an infrastructure that utilizes existing roadside markers, with only minor modifications to those roadside markers. It does not depend upon uniform width of the roads.

The infrastructure provides advantages over computer vision and GPS. The RFID environment is better suited than GPS for detecting lateral lane position of fast-moving vehicles. It is better suited than computer vision for detecting lateral lane distances in inclement weather and other conditions (e.g., snow, sand, smoke, thick fog, white out conditions) that obscure lane lines and other road details. Thus, the infrastructure creates much greater safety for autonomous vehicles in both normal and difficult conditions.

A transit system herein is not limited to standard RFID devices 140. RFID devices that differ from the standard may be used. For instance, the non-standard RFID device operates similar to a standard RFID device, but may communicate over non-standard radio frequencies (e.g., special frequencies slotted for autonomous navigation, or utilize frequencies currently utilized by vehicle sensors, such as frequencies used by tire pressure sensors). In this case the RFID device(s) may broadcast at frequencies to be reserved by the International Organization for Standardization for navigation systems. The RFID device(s) may have different nomenclature. Other aspects of standard RFID may be altered including, but not limited to, range, memory size, and memory configurations.

A transit system herein is not even limited to RFID. The RFID devices 140 described herein are but one type of RF device. The pavement markers may carry other types of RF devices instead of, or in addition to, RFID devices. These other types of RF devices include, but are not limited to, WiFi devices, Bluetooth devices, and ZigBee® devices. The RF devices generate and transmit RF navigation signals.

The invention claimed is:

1. An apparatus comprising:
a pavement marker configured to be mounted to a road at a lane line of a lane at known orientation with respect to the lane line; and
an RF device carried by the pavement marker, the device configured to transmit a directional RF navigation signal and positioned relative to the known orientation to transmit the signal across the lane in a direction that is substantially normal to the lane line.

2. The apparatus of claim 1, wherein the RF device is a passive RFID device.

3. The apparatus of claim 2, further comprising a second passive RFID device carried by the pavement marker, the second passive RFID device configured to transmit a second RF navigation signal in a direction that is substantially normal to the lane line but in a direction opposite the first RF navigation signal.

4. The apparatus of claim 1, wherein the pavement marker includes markings for road installation at the known orientation.

5. The apparatus of claim 1, wherein the pavement marker has a mounting surface; and wherein the RF navigation signal has an incline angle between about 30 and 90 degrees with respect to a normal to the mounting surface.

6. The apparatus of claim 1, wherein the pavement marker includes a raised pavement reflector; and wherein the RF device includes a passive RFID device carried by the raised pavement reflector.

7. The apparatus of claim 1, wherein the pavement marker includes pavement marking tape; and wherein the known orientation is established by a stripe on the tape or an edge of the tape.

8. The apparatus of claim 7, further comprising a plurality of additional RF devices on the tape, the additional RF devices spaced apart at a regular interval, each additional RF device configured to transmit an additional RF navigation signal in a direction that is substantially normal to the stripe or edge of the tape.

9. The apparatus of claim 1, wherein the RF device is a passive RFIID device including a chip and an off-chip antenna.

10. The apparatus of claim 1, further comprising a second passive RF device for transmitting a warning signal at a transmission angle between −45 and −90 degrees.

11. The apparatus of claim 1, further comprising a second passive RF device for transmitting a road information signal at a transmission angle between 45 and 90 degrees.

12. The apparatus of claim 1, further comprising an RF reflector carried by the pavement marker and configured to focus incoming energy onto an antenna of the RF device.

13. The apparatus of claim 12, wherein the reflector is a parabolic reflector; and wherein the antenna is at a focus of the parabolic reflector.

14. The apparatus of claim 13, wherein the antenna is omnidirectional.

15. The apparatus of claim 1, wherein the antenna is directional.

16. The apparatus of claim 1, further comprising an RF absorptive structure for preventing unintended signals from reaching the RF device.

17. The apparatus of claim 1, further comprising a compound structure having a reflective surface for focusing incoming radiation onto an antenna of the RF device, and an RF absorptive structure for preventing unintended signals from reaching the RF device.

18. A system for lateral lane positioning of vehicles on a road, the system comprising:
pavement marking means mounted to the road at lane lines; and
a plurality of RF devices carried by the pavement marking means, the RF devices spaced apart at a regular interval, each of the RF devices configured to transmit a directional RF navigation signal across the road at a fixed transmission angle of about zero degrees with respect to a normal to its associated lane line.

19. The system of claim 18, wherein the pavement marking means includes pavement marking tape; and wherein the RF devices are mounted to the pavement marking tape.

20. The system of claim 18, wherein the pavement marking means includes a plurality of raised pavement markers along the lane lines; and wherein the RF devices are carried by at least some of the raised pavement markers.

21. The system of claim 20, wherein each raised pavement marker is configured with a known orientation with respect to its associated lane line; and wherein each device is positioned relative to the known orientation to transmit the directional RF signal at the about zero degree transmission angle.

22. The system of claim 18, wherein the pavement marking means includes a first plurality of raised pavement markers along one side of a lane of the road, and a second plurality of raised pavement markers spaced apart along an opposing side of the lane; and wherein the plurality of RF devices includes a first set carried by the first plurality of raised pavement markers and a second set carried by the second plurality of raised pavement markers.

23. A motor vehicle comprising:

a body;

an RF antenna mounted to the body at a location for receiving RF navigation signals during movement of the vehicle;

an RF module, mounted on the body, the module configured to broadcast interrogator signals in timed radio pulses as a function of distance between pavement markers and speed of the vehicle, and receive RF navigation signals in response to the interrogator signals, the module further configured to process the received RF navigation signals to determine a sequence of lateral lane distances; and means, responsive to changes in the sequence of lateral lane distances, for automatically taking a corrective action if the changes indicate drift of the vehicle.

24. The vehicle of claim 23, wherein the means includes a vehicle control responsive to the changes in the sequence of lateral lane distances for lateral lane positioning of the vehicle.

* * * * *